Dec. 7, 1926. 1,609,350
M. EPSTEIN
SPECTACLE FRAME
Filed Oct. 20, 1923
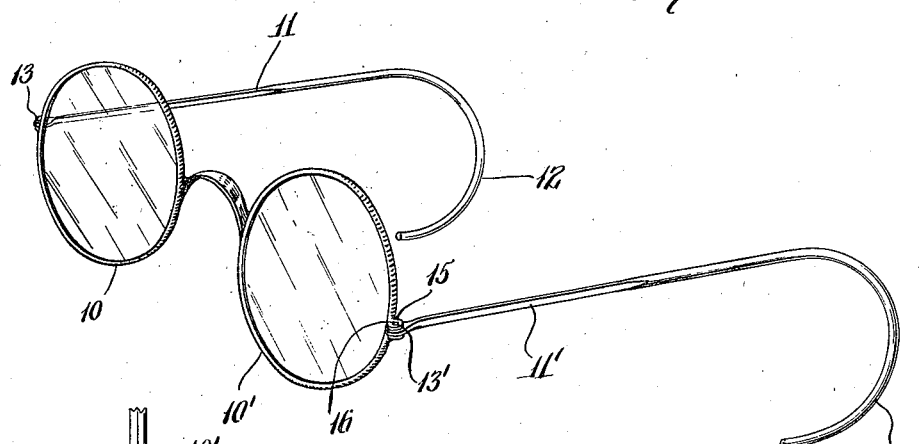
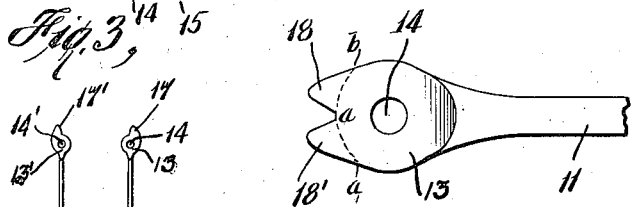
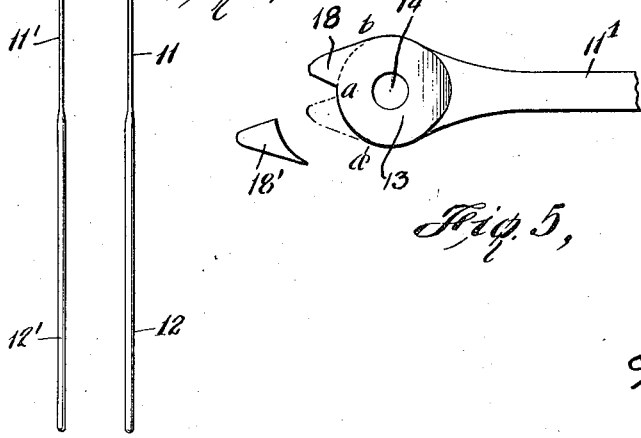
INVENTOR
Max Epstein
BY
ATTORNEY Patented Dec. 7, 1926.

1,609,350

UNITED STATES PATENT OFFICE.

MAX EPSTEIN, OF NEW YORK, N. Y.

SPECTACLE FRAME.

Application filed October 20, 1923. Serial No. 669,656.

This invention relates to spectacle frames. More particularly, it is directed to improvements in the construction of the temple pieces for such frames.

In the spectacle frames now generally in use, the temple pieces which are pivoted to the rims are provided with small lugs adjacent the pivotal points to act as stops against the rims when the temples are unfolded for use. These lugs extend in opposite directions on the pair of temples so as to move toward each other as the temple pieces are unfolded. In consequence, it has heretofore been necessary for the optician or supplier to have on hand sets of temple pieces with the lug member extending in one direction for right temples, and sets of temple pieces with the lug members extending in the opposite direction for left temples. This has caused considerable inconvenience as it often happens that one is out of stock of one or the other kind of temple piece, and furthermore, has resulted in increased expense because of the necessity of having on hand a supply of both kinds of temple pieces.

One object, thereof, of this invention is to provide a temple piece which may be adapted for use either as a left or right hand temple.

Another object is to provide a temple bar of the type described having a double lug or extension adapted to be cut away so as to provide either a right or left hand temple as desired.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention, Fig. 1 is a perspective view showing the spectacle frame with the temple bars attached in the usual manner;

Fig. 2 is a view showing a pair of right and left temples;

Fig. 3 is a partial detail view showing the connection of the temple piece to the spectacles;

Fig. 4 is a partial plan view showing a temple piece embodying this invention; and Fig. 5 is a like plan view showing the temple piece illustrated in Fig. 4 after it has been cut away so as to leave only one lug to provide a right hand or left hand temple piece of the construction illustrated in Fig. 2.

Referring in detail to the drawing, 10, 10' indicate respectively the right and left hand spectacle rims to which are pivoted the right and left hand temple pieces 11, 11' respectively. The temple pieces are of the usual construction shown in Fig. 2 having ear pieces 12, 12' at their free ends and being provided with pivot members 13, 13' at their other ends having openings 14, 14' adapted to register with the openings in the ears 15 extending from the spectacle rims so as to receive the pivot pin 16. Lugs 17, 17' extend from the pivot members 13, 13' in opposite directions as shown in Fig. 2 so that as the temple pieces are unfolded when the spectacles are to be used these lugs 17, 17' will abut against the corresponding spectacle rims so as to prevent the temples from being folded too far back, all in the manner well known in the art.

In order to provide a temple piece which may be very readily adapted for use either as a right or left temple, I provide in my improved device a pivot member 13 with two lugs 18, 18' of similar size and shape and arranged symmetrically with reference to the longitudinal axis of the temple piece. If a right hand temple is required, the lug 18' may be cut or broken away along dotted line a—a in Fig. 4, thus leaving a construction such as shown in Fig. 5 and resulting in a temple piece like that indicated by 11 in Fig. 2. If, on the other hand, a left hand temple is desired, lug 18 is broken or cut away along line a—b in Fig. 4 leaving a temple piece like that indicated by 11' in Fig. 2.

It will be at once obvious that with a supply of temple pieces embodying my invention having the double lug extensions, the optician can very readily and with hardly any additional expense of time, labor or material provide a left or right temple as desired.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. A temple piece comprising a body portion, an ear portion extending at one end thereof, and a pivot member at the other end, said pivot member having a pair of lugs symmetrically arranged with respect to the body portion, either lug of said pair being adapted to be cut away prior to attachment to a spectacle frame.

2. In a temple piece, a pivoting member having a pair of lugs of uniform size and shape symmetrically arranged with respect thereto, either lug of said pair being adapted to be cut away prior to attachment.

3. In a spectacle frame construction, a temple piece having a pivoting member, a pair of similar lug projections forming part of said member, either lug being adapted to be cut away for fitting said piece to the frame.

In testimony whereof I affix my signature.

MAX EPSTEIN.